Sept. 26, 1939.   J. C. HEINTZ   2,174,188
TIRE MOLDING APPARATUS
Filed June 17, 1936
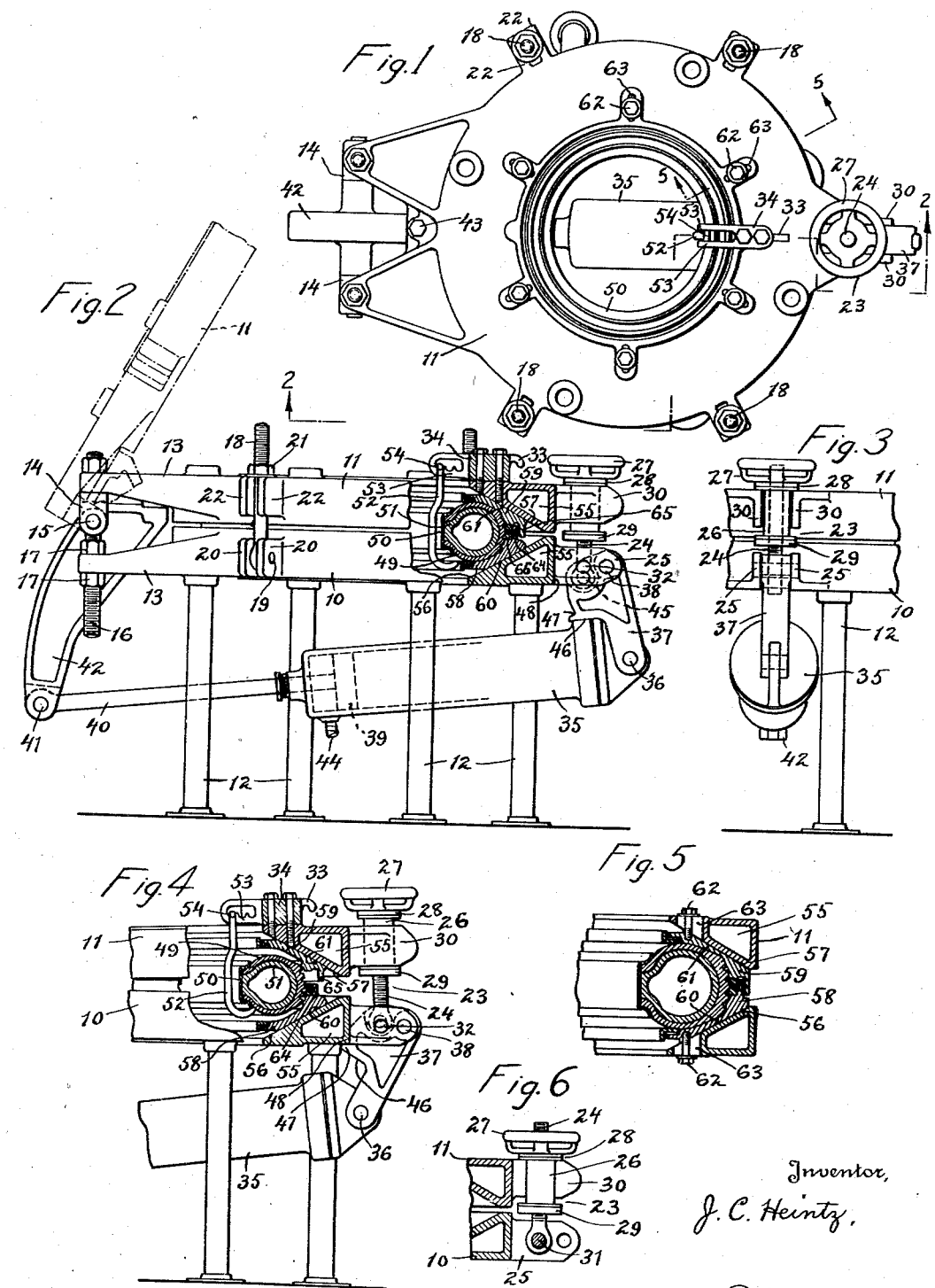
Inventor,
J. C. Heintz,
By Robert M. Pierson,
Attorney Patented Sept. 26, 1939

2,174,188

UNITED STATES PATENT OFFICE 2,174,188

TIRE MOLDING APPARATUS

James C. Heintz, Lakewood, Ohio

Application June 17, 1936, Serial No. 85,673

4 Claims. (Cl. 18—18)

This invention relates to tire molding heaters or vulcanizers, and particularly to full-circle retreading apparatus. Its principal object is to provide improved heater equipment of the power-operated type.

Of the accompanying drawing, Fig. 1 is a top plan view of a full-circle retread vulcanizer or heater press constructed according to my invention, with a rim-mounted tire therein.

Fig. 2 is a side elevation of the closed heater press, partly in section, on line 2—2 of Fig. 1, with the open position of the upper platen partly illustrated in broken lines.

Fig. 3 is a partial front elevation.

Fig. 4 is a fragmental view corresponding to Fig. 2, showing the heater press partly open.

Fig. 5 is a partial vertical section on line 5—5 of Fig. 1, showing a different size of matrix and tire in the vulcanizer.

Fig. 6 is a partial vertical section showing the closed vulcanizer without a power ram.

Referring to the drawing, the heater press or vulcanizer is composed mainly of a pair of lower and upper annular platens 10, 11, mounted in a horizontal closed position on legs 12 supporting the lower member 10, said platens being rearwardly formed with hinge lugs 13 connected by a hinge which is constituted by a pair of upper bearing members 14 on the platen 11, a hinge pin 15 through said members, and a pair of screw-stem eye-bolts 16 on the lower platen 10, embracing said pin at their upper ends and having the usual adjusting nuts 17 for spacing the platens a greater or less distance apart to correspond with the thickness of the tire mold.

For forcing the platens together to provide the molding pressure, any suitable means may be employed, operated either manually or by power or both. Such means may, for example, consist mainly of the usual set of circumferentially spaced clamping bolts 18 with screw stems pivoted at their lower ends on pins 19 between lugs 20 formed on the lower platen, and nuts 21 engaging, through suitable washers, lugs 22 formed on the upper platen.

An additional pivoted clamping bolt 23 is provided at the front of the vulcanizer, and usable either with or without a power ram, principally for the purpose of "cracking" the mold, or initially forcing the platens and their attached mold members apart to separate one of them (usually the upper member) from the vulcanized tire. This special clamping bolt comprises a vertical screw stem 24 pivoted at its lower end, either directly or indirectly to a pair of lugs 25 formed on the lower platen 10, and a nut 26 turnable on said screw stem by an upper hand-wheel 27, and having upper and lower flanges 28, 29 acting through suitable washers against the upper and lower edge faces respectively of a pair of lugs 30 which are formed on the upper platen 11, said shoulders being spaced further apart than the height of the lugs to permit swinging the bolt downwardly to an inoperative position. By raising the nut 26 to bring the washer of its lower flange 29 against the lugs 30, the initial mold-opening or cracking movement may be imparted to the upper platen. When the vulcanizer is used without a power ram, the lower end of the bolt stem 24 is pivoted upon a pin 31 (Fig. 6) removably mounted directly on the lower lugs 25, in apertures 32 (Fig. 2) in the latter. The bolt 23 may then also conveniently be used to supplement the action of the bolts 18 in clamping down the upper platen. When the vulcanizer is thus operated without a power ram, after loosening or cracking the upper platen 11 from the vulcanized tire, said upper platen may be swung to a fully open position by any suitable means, such as an ovehead chain tackle applied to a hook 33 which is formed on a block or bracket 34 bolted to said platen near the front edge thereof.

In Figs. 1 to 4 I have illustrated the application, to the vulcanizer, in a convenient and compact arrangement, of a fluid-pressure plunger motor or ram disposed in a nearly horizontal position, diametrically below the lower platen, for cracking the upper mold member from the tire, stripping the tire from the lower mold member, and swinging the upper platen to a fully-open position.

Said ram comprises a single-acting, fluid-pressure cylinder 35 pivotally hung on a pin 36 at the front of the vulcanizer, upon the long-arm of a bell-crank lever 37 which is pivoted at 38 between the lugs 25 of the lower platen, and a piston 39 in said cylinder, whose rod 40 is pivoted by a pin 41 to the lower end of a long hinge arm 42 surrounding the pivot pin 15 between the bearings 14 and detachably connected with the rear end of the upper platen 11 by a screw 43 (Fig. 1).

The pressure medium, such as oil, is admitted to and discharged from the rear end of the cylinder through a flexible pipe connection 44. To the shorter arm of the lever 37 is pivoted the lower end of the clamping bolt stem 24 by a pin 45 which replaces the fixed pin 31 of Fig. 6, employed when the vulcanizer is used without the ram. When the platens are together and the ram cylinder discharged as shown in Fig. 2, the bolt 23 will be depressed and the retracting movements of the cylinder 35 and lever 37 limited by the abutting of the rear cylinder head against a shoulder 46 on said lever.

Another stop 47 on the bell-crank lever, engaging a complemental fixed stop 48, on the lower platen between the lugs 25, limits the opposite leftward movement of said parts as shown in Fig. 4 to arrest the cylinder and allow its piston 39 to raise the upper platen.

49 is a tire casing mounted between mold members carried by the respective platens and mounted on a rim 50 and containing an inflatable elastic core or air bag 51. For automatically stripping said tire from the lower mold member by the motion of the upper platen, communicated thereto from the lever 37 through the lower nut flange 29 engaging the lower edges of the lugs 30, I provide a stripper member 52 in the form of a stiff rod having a hooked lower end and suspended at its upper end from a pair of slotted racks 53 formed on the block 34, by means of T-head studs 54 seated in the notches which are radially spaced in pairs on the racks to accommodate different diameters of rims. When the vulcanizer is fully closed as shown in Fig. 2, the point of the hook on the member 52 is spaced from the lower rim flange by a distance sufficient to permit the cracking of the upper platen 10 as shown by its spacing from the tire 49 in Fig. 4, whereupon the hooked member engages the tire rim and strips the tire from the lower mold member, as shown by its spacing from said member in said view.

Each of the platens 10 and 11 is jacketed with an annular chamber 55 for the circulation of a heating fluid such as steam, and said platens are concavely formed internally with respective female conical seating surfaces 56 and 57. On the respective platens are detachably mounted lower and upper mold members or matrix rings 58 and 59 which are convexly formed externally with male conical seating surfaces 60 and 61 in intimate heat-transferring relation to the surfaces 56 and 57. The mold members are secured to the respective platens by screws 62, shown in Figs. 1 and 5 and occupying radially elongated slots 63 in the platens, whereby the position of said screws may be radially shifted according to the particular size of mold member in the vulcanizer.

I have found that a cone angle for the seating surfaces 56, 60 and 57, 61, of the order of 30 degrees to the central plane, affords the best combination of width of contact zone between the pairs of conical surfaces and range of mold diameters which can be accommodate between the platens 10 and 11.

The mold members are formed with registering peripheral flanges comprising an upstanding flange 64 on the lower member 58 and a depending flange 65 on the upper member, concentrically surrounding said flange 64 and separated therefrom by a narrow air space, this arrangement also serving to reduce the radiation and conduction of heat from the periphery of the mold exposed between the platens. The matrix rings 58, 59 may be formed for use with or without a spacer ring such as 66 shown as detachably affixed by a screw fastening to the flange 64 of the lower matrix ring.

The described mode of interchangeable conical seating of retreading matrices upon platens of variable lateral spacing, having matrix seats radially wider than said matrices, to provide a plurality of seating zones, is claimed in my copending application Ser. No. 184,644, filed January 12, 1938.

In the operation of this apparatus, a rim-mounted tire 49 bearing a raw tread is placed in the lower mold member 58 of the open vulcanizer, the upper platen 11 is swung down thereon, the clamping bolts 18 and 23 are swung up into their operative positions and their nuts screwed down to close the mold tightly upon the tire, the latter is inflated to a vulcanizing pressure and the curing of the tread proceeds. When the cured tire is to be removed, it is deflated and the clamping bolts 18 loosened and swung down out of the way. If the vulcanizer is provided with a power ram as described, fluid pressure is admitted to the left-hand end of cylinder 35 and at first has no effect in moving the piston 39 because of its mechanical disadvantage with respect to the upper platen 11 on account of the long hinge arm 42, but the pressure draws the cylinder 35 and depending arm of lever 37 to the left, raising the lower flange 29 of nut 26 against the lugs 30 and cracking the upper platen at its front edge away from the tire as shown in Fig. 4. The stripper hook 52 being in place, a continuation of this movement causes it to engage the lower flange of the tire rim 50 and strip the tire from the lower mold member 58 as also shown in said view. The pressure is then temporarily released from the cylinder, allowing the loosened tire to descend slightly and the upper platen to descend upon the tire so that the stripper hook 52 can be removed or thrown back, and allowing the clamping bolt 23 to be swung down to an inoperative position, while the mold is being fully opened. To accomplish this, the pressure is restored in the cylinder and the foregoing movements of said cylinder and the lever 37 are repeated. When the lever stop 47 brings up against the fixed stop 48, preventing further leftward movement of the cylinder, a continuation of pressure in the latter then moves the piston 39 forwardly, correspondingly swinging the long hinge arm 42 and raising the upper platen 11 to the fully-open position shown in broken lines in Fig. 2, whereupon the loosened tire can be removed from the mold by hand or with the aid of an overhead tackle. As previously indicated, the apparatus can be supplied either with or without the power ram, and when the latter is removed and a fixed pin 31 substituted for the lever pin 45 as shown in Fig. 6, the cracking of the mold is performed by manually unscrewing the nut 26 upwardly, the stripping of the tire may be performed in like manner as will be understood from Fig. 4, and the final swinging of the upper platen to a fully-open position is performed without the aid of the ram, as specifically illustrated in my aforesaid application Ser. No. 184,644, whose matrix mounting applies to either form.

The described conical mounting of the mold or matrix members in the vulcanizer 7 covered in the latter application, permits the employment in a single heater of a complete set of matrix members for the entire range of passenger-car tires or for another group or groups of sizes such as truck tires, merely requiring a larger vulcanized, the use of matrix sections of excessive radial depth and inadequate heat conductivity is avoided, and ample areas of contact between the matrix rings and the steam jacketed vulcanizer platens are provided, to insure the most efficient transfer of heat to the tire. This feature could be used with vulcanizers of different types than the one illustrated, and vice versa.

It will be understood that the form of embodiment may otherwise be considerably varied without departing from the scope of my invention as defined in the claims.

I claim:

1. A vulcanizer press comprising a pair of platens hinged together at one edge, screw means at the opposite edge for moving said platens together and reversely operable to separate the platens, and a power ram operable on the screw means to separate the platens.

2. A vulcanizer comprising a substantially horizontal fixed lower press platen, an upper platen hinged at one side of said lower platen and having a relatively-long operating arm on that side, means at the opposite side for starting the opening of the upper platen, and a power ram extending across the vulcanizer below the lower platen and having one end connected with the starting means to first operate the latter in opening the vulcanizer and its opposite end connected to said long arm to thereafter swing the upper platen to a fully-open position.

3. A vulcanizer comprising press platens, one of which is pivoted, means for starting the opening of the pivoted platen, a single-acting, fluid-pressure ram connected at one end with said means, and a connection between the pivoted platen and the opposite end of said ram, causing the latter to act at a mechanical disadvantage at said opposite end while operating the starting means, and thereafter to fully open said pivoted platen.

4. A vulcanizer press comprising a fixed lower platen, a pivoted upper platen having a relatively-long hinge arm, a lever on the lower platen on the side opposite from the hinge, a stop for said lever, a mold opener carried by the lever and movable to an inoperative position, and a fluid-pressure cylinder and piston whose members are attached to the hinge arm and lever respectively, for operating said lever to start the mold opening without moving the hinge arm, and for swinging said arm to fully open the mold when the lever is against its stop.

JAMES C. HEINTZ.